June 3, 1952  D. P. FORBES  2,599,247
BRAKE MECHANISM
Filed March 20, 1947  3 Sheets-Sheet 1

Inventor
Duncan P. Forbes
By
McCanna and Morsbach
Attys

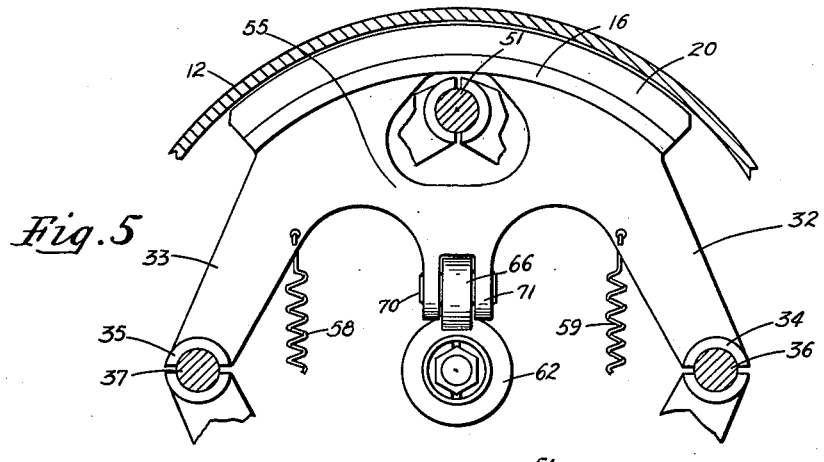
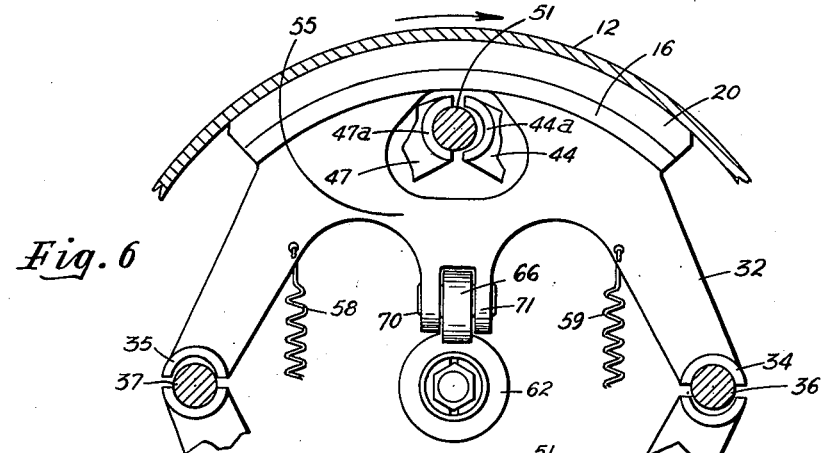
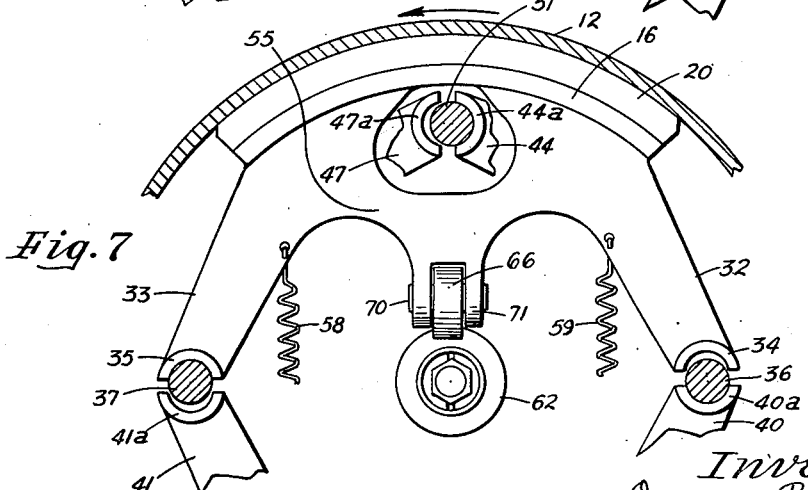

June 3, 1952 D. P. FORBES 2,599,247
BRAKE MECHANISM
Filed March 20, 1947 3 Sheets-Sheet 3

Inventor
Duncan P. Forbes
By McCanna and Morsbach
Attys.

Patented June 3, 1952

2,599,247

UNITED STATES PATENT OFFICE 2,599,247

BRAKE MECHANISM

Duncan P. Forbes, Rockford, Ill., assignor to Gunite Foundries Corporation, Rockford, Ill., a corporation of Illinois Application March 20, 1947, Serial No. 736,002

8 Claims. (Cl. 188—78)

1

This invention relates to a multi-shoe vehicle brake or clutch mechanism.

A principal object of the present invention is to provide a brake mechanism of the above character in which each shoe is arranged for independent movement about each of two points, whereby the shoe is rotatable about one of the points against a brake drum to provide a self-energizing action during forward movement of the vehicle, and is rotatable about the other point to provide a self-energizing action during backward movement of the vehicle.

Another object of this invention resides in the provision of a brake mechanism in which each shoe is independently rotatable about either of two anchor pins, these pins being so located with respect to the shoe and the drum that movement of the shoe about either pin will move both ends of the shoe subtantially uniformly toward or away from the shoe engaging surface of the drum upon rotation about either anchor pin to produce similar engagement of the the brake lining with the drum in each direction of rotation thereof.

Another object of this invention is to provide a multi-shoe brake mechanism of the above character for use with a wheel which is self-energizing in either direction of rotation of the wheel and which requires the same amount of force for actuation of the mechanism in either direction of rotation of the wheel.

Another object of this invention is to provide a multi-shoe brake mechanism for use with a brake drum in which there is uniform pressure applied between each shoe and the drum upon actuation of the brake mechanism irrespective of the direction of rotation of the drum and in which each shoe, irrespective of the direction of rotation of the drum wears in a uniform manner.

The invention also resides in the novel construction of the mechanism for actuating the brake shoes.

Other objects and advantages of the invention will become apparent from the following detailed description taken in connection with accompanying drawings, in which—

2

Figure 1:
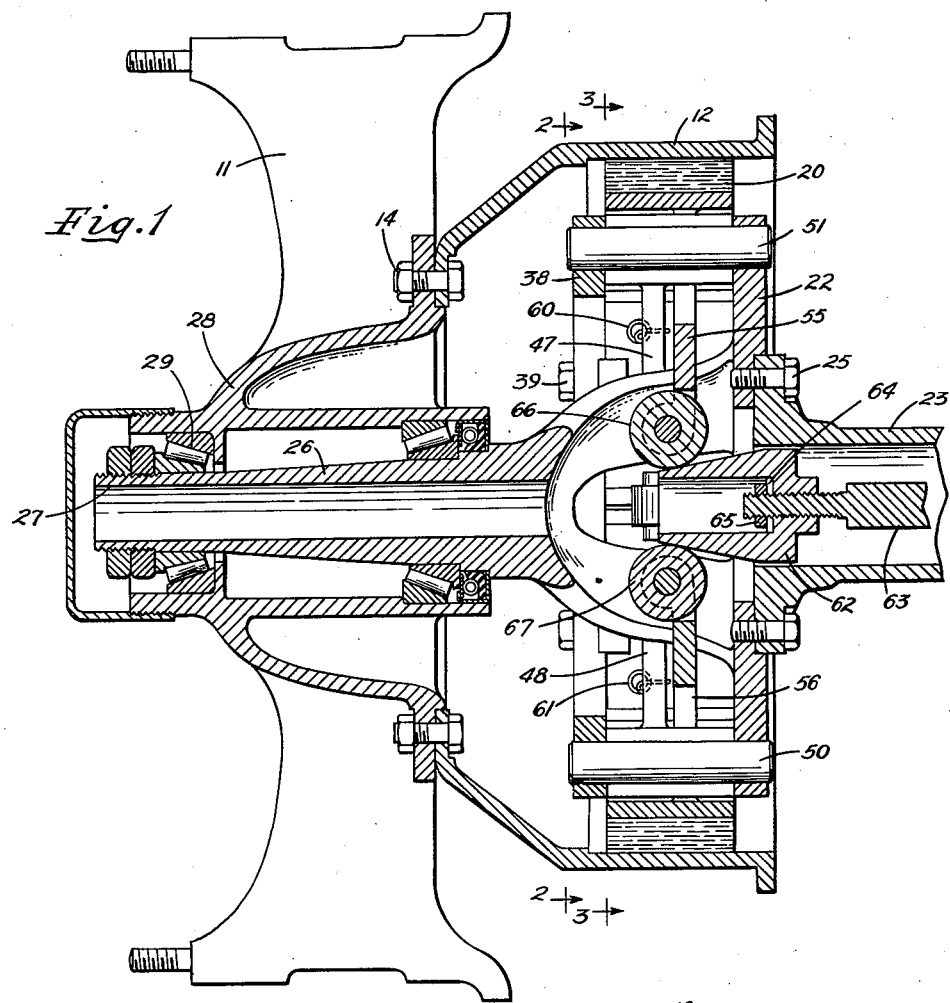
Figure 1 is a view of a trailer wheel having the brake mechanism embodying the present invention mounted thereon.
Figure 2:
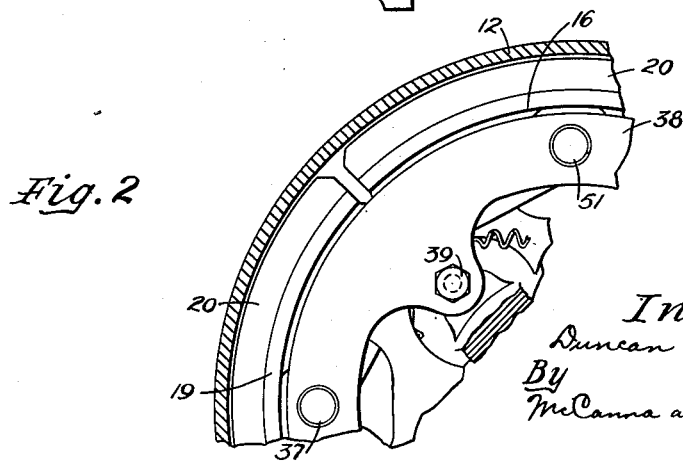
Fig. 2 is a fragmentary sectional view of Figure 1 taken substantially along the line 2—2.

Fig. 5 is a fragmentary view of one of the brake shoes shown in a retracted position;

Fig. 6 is a view similar to Fig. 5 showing one of the brake shoes in engagement with the brake drum which is shown as rotating in clockwise direction, and Fig. 7 is a view similar to Fig. 6 showing the drum rotating in a counterclockwise direction.

Referring now to the drawings, the invention is shown embodied in a brake mechanism mounted on a wheel 11 of a heavy duty vehicle such as a trailer, though it will be understood that the brake mechanism may be applied to any vehicle wheel by changes in the space relation and shape of the parts to adapt it to different locations. The mechanism is arranged to brake or arrest the rotational motion of the wheel 11 in either direction of rotation in accordance with the wishes of the operator of a pulling or driving vehicle. The specific embodiment of the invention, chosen for purposes of illustration, comprises in general a brake drum 12 of conventional construction secured to the wheel 11 by annularly spaced machine bolts 14, segmental brake shoes 16, 17, 18 and 19 (see Fig. 3) arranged to move into and out of frictional engagement with the drum 12, and means for controlling the movement of the shoes. The shoes 16—19 and actuating mechanism are supported in general by an annular mounting flange 22 secured to an axle tube 23 by annularly spaced bolts 25 and carrying the inboard end of a spindle 26. The spindle has a central bore 27 to permit the insertion of a tool for adjustment of the brake mechanism as will presently appear, and carries the usual wheel hub 28 and bearings 29.

In prior brake designs of this character having segmental brake shoes, the geometry of the drum and the shoes have been such that only a portion of the available surface of the brake drum has been utilized in the braking action. Such brake structures have two serious faults; first, because of a lesser amount and area of brake lining, the lining wears away at a more rapid rate, requiring more frequent replacement and, secondly, the brake drums become distorted because of the unequal pressure applied thereto by the brake shoes, thus materially contributing to heat checking of the drums. Furthermore, the power requirements are not the same for both directions of rotation of the drum. Also there has been a tendency to stretch the drum so that it becomes oblong-shaped whenever the brakes are heavily applied. Accordingly, my invention is concerned with the provision of a novel construction and mounting of the brake shoes 16—19 so that the efficiency of the brake mechanism is increased, and at the same time permitting approximately equal "self-energization" of the braking mechanism in either a forward or a backward direction of rotation of the vehicle wheel 11.

Thus, it contemplates brake shoes 16—19 mounted so that as the brake mechanism is actuated each shoe moves outwardly and engages the drum 12 throughout the entire surface area of each shoe. It further contemplates that upon engagement of the shoes with the drum the brake mechanism will be "self-energized" in either direction of rotation of the vehicle wheel 11 so that less actuating power will be required to hold the shoe in engagement with the drum 12.

Figure 3:
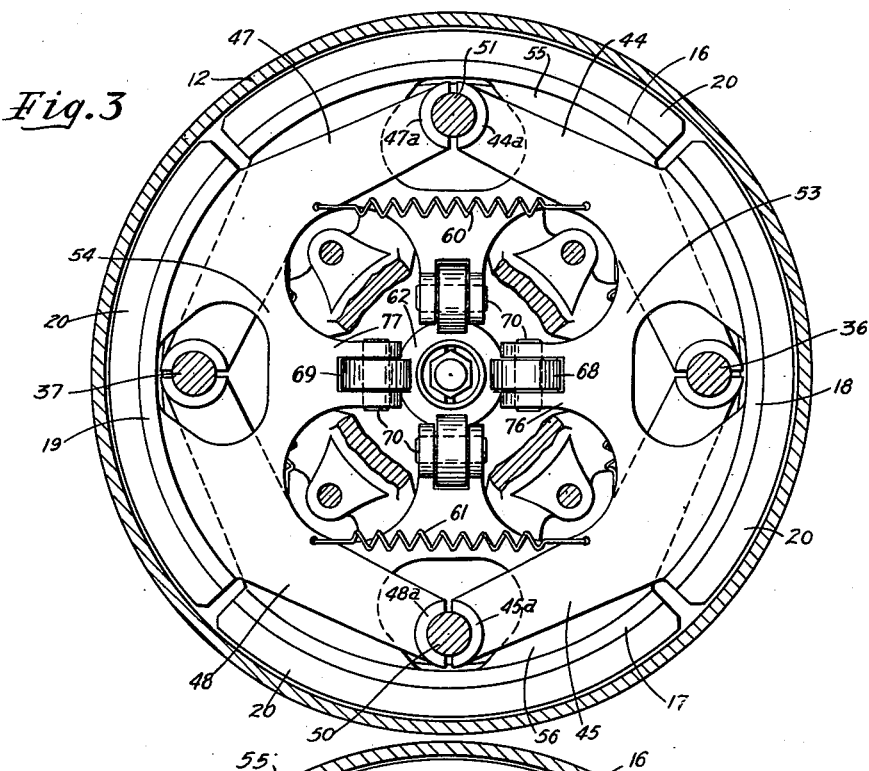
Fig. 3 is a sectional view taken substantially along the line 3—3 of Figure 1.

As best shown in Fig. 3, each brake shoe preferably takes the form of an arcuate member of substantially 90° arc length, the shoe being short of 90° by an amount sufficient to permit mechanical assembly and tolerances in manufacturing. To utilize the maximum frictional surface of the drum 12, four brake shoes 16, 17, 18 and 19 are utilized and are spaced annularly around the interior of the drum so that each shoe frictionally engages approximately one-fourth of the total braking surface of the drum. The face of each shoe is lined with a conventional brake lining 20 to form a suitable friction surface.

The brake shoes 16—19 in this instance are mounted so as to have translatory movement into engagement with the drum 12 and upon such engagement to swing about fixed pivots for frictionally bearing against the drum 12. It is apparent from the drawings that each of the shoes is of similar construction and mounted in the same manner with respect to movement in the drum. Consequently only the shoe 16 and the mounting thereof will be described in detail. The shoe 16 (see Figs. 5–7) is provided with rigid arms 32 and 33 integral with the arcuate portion and extending rearwardly from the back of the shoe in spaced relation. At the outer end of each arm is a semi-cylindrical sleeves 34 and 35 respectively shaped to receive anchor posts or pins 36 and 37, respectively. The latter members are supported by the mounting flange 22 (Fig. 1) and an annular flange 38 secured to the spindle 26 by annularly spaced bolts 39. The pins 36 and 37 are spaced 180° apart and on opposite sides of the rotational axis of the drum. As readily seen in Fig. 5, the shoe 16 is disposed centrally of the pins 36 and 37 so that the center of the shoe is substantially 90° from either pin and is arranged to be independently movable about either pin. It will be observed with this construction that as the shoe 16 is translated outwardly the engagement of the shoe with the drum 12 (assume clockwise rotation of the drum as shown in Fig. 6) will cause the shoe 16 to be swung about the pin 36 in a clockwise direction. As the shoe 16 swings about the pin 36 the shoe 16 is swung out of pivotal engagement with the pin 37. Each pin is of sufficient rigidity and strength as to withstand the torque or force caused by the frictional engagement of the respective shoe with the drum. It will be further observed that the geometry of the brake mechanism; that is, the relation of the shoe arms and the location of the pins with respect to the rotational axis of the drum and the friction surface of the drum, is such that both end surfaces of the brake shoe 16 are moved substantially uniformly toward engagement with the braking surface of the drum. As shown in Fig. 3, the brake shoe 16 is of symmetrical construction. Thus, it is apparent for counterclockwise rotation of the drum as illustrated in Fig. 7, the shoe 16 pivots about the pin 37 in a counterclockwise direction. The two ends of the shoe, however, move approximately uniformly toward the drum as described for clockwise rotation of the drum. It is evident with this construction that the lining 20 will give uniform engagement and wear uniformly regardless of the direction of rotation of the drum and will always be of such configuration that the entire friction surface of each shoe engages the drum 12.

Figure 4:
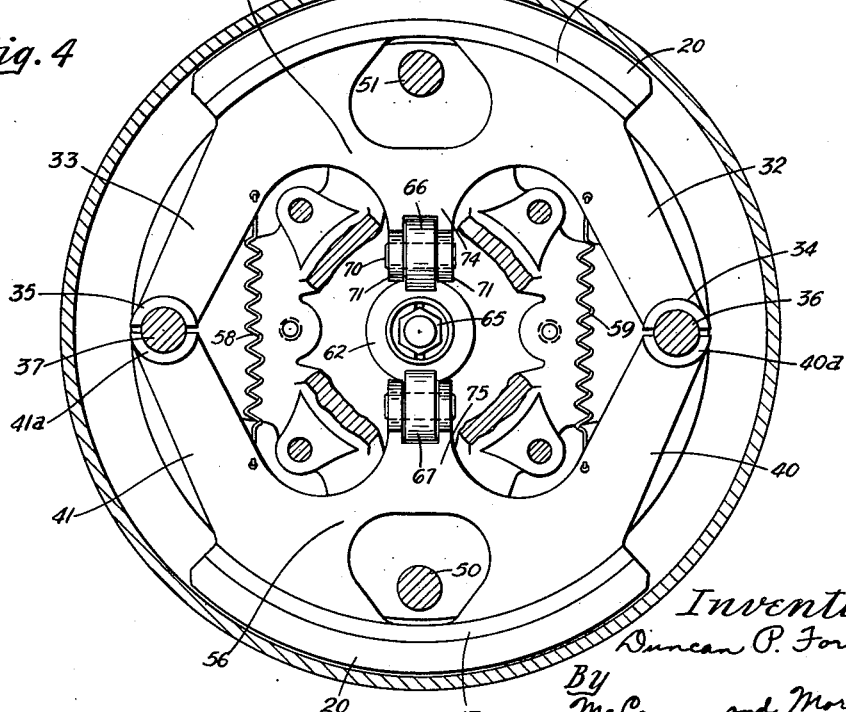
Fig. 4 is a sectional view similar to Fig. 3 with two brake shoes removed.

To simplify the construction and also to make a compact assembly, the shoe 17 on the diametrically opposite side of the drum 12 has arms 40 and 41 with semi-cylindrical sleeves 40a and 41a (see Fig. 4) respectively, receiving the sides of the pins 36 and 37 opposite the sleeves 34 and 35, respectively. The arms of both shoes 16 and 17 lie in a common plane adjacent the mounting flange 22 as shown in Figure 1.

The shoes 18 and 19 (see Fig. 3) including arms 44 and 45 and semi-cylindrical sleeves 44a and 45a, respectively, and arms 47 and 48 and semi-cylindrical sleeves 47a and 48a, respectively, are arranged to pivot about anchor pins 50 and 51 in the same manner as shoes 16 and 17 pivot about the pins 36 and 37. Pins 50 and 51 are also spaced 180° apart and are intermediate the pins 36 and 37. The arms 44 and 45, 47 and 48 also lie in a common plane. This plane is disposed at the side of the plane in which the arms 32, 33, 40 and 41 are disposed adjacent the flange 38. Each pin 36, 37, 50 and 51 projects through an opening formed in strengthening webs 53, 54, 55 and 56, connecting the arms of each shoe. The opening is of such size and shape as to permit free movement of each shoe.

Means is provided for moving the shoes 16—19 into and out of frictional engagement with the brake drum 12. To this end a cam or wedge is utilized for moving the shoes 16—19 outwardly against the force of resilient members arranged to retain the shoes in a retracted or unengaged position. The resilient members are in the present embodiment in the form of springs 58 and 59 stretched between shoes 16 and 17 (see Fig. 4), and springs 60 and 61 stretched between shoes 18 and 19, respectively (see Fig. 3).

The shoes are in the present embodiment moved outwardly into engagement with the brake drum by a cam in the form of an axially slidable cone-shaped member 62 disposed within the axle tube 23 and mounted on one end of an actuating shaft 63 by a threaded connection so as to be adjustable thereon. The cone 62 is provided with a cross slot 64 for engagement by a spanner wrench inserted through the bore 27 of the spindle to adjust the position of the cone on the shaft 63 for adjustment of the brake mechanism, and a lock nut 65 also operable by a wrench inserted through the bore 27 secures the cone in adjusted position. In its axial movement the cone-shaped member 62 engages rollers 66, 67, 68 and 69 journaled on pins 70 supported by spaced fingers 71 formed by a slot at the inner ends of centrally disposed arms 74, 75, 76 and 77. The latter arms are intermediate the ends of the brake shoes 16—19, respectively, and project rearwardly therefrom midway between the mounting arms of each respective shoe. The spaced fingers 71 of each arm 74—77 are fashioned and arranged in the mechanism so that the rollers 66—69 all lie in a common plane as shown in Figure 1, and when the cone is shifted axially into engagement with the rollers, a substantially equal force is applied to each respective roller 66—69 by the cone 62. It is apparent from Fig. 3 that the same amount of force will actuate the brake in either direction of rotation of the drum. With this construction, friction between different parts is minimized, and where friction does exist in the mechanism, it has substantially the same effect on all similar parts so that each of the shoes will be affected similarly. While the present embodiment utilizes a cam and rollers for moving the shoes radially, any suitable means may be utilized for effecting radial movement of the shoes, such as those well known in the art operating by means of magnetic, hydraulic or mechanical power.

The operation of the brake mechanism is apparent from the foregoing but may be briefly summarized as follows:

Whenever the operator desires to apply the brakes so as to stop the vehicle, he presses a lever, etc., (not shown) in the conventional manner, which results in the cone 62 being shifted axially into engagement with the rollers 66—69. This axial movement of the cone 62 against the rollers urges the brake shoes 16—19 outwardly against the action of the springs 58 and 59, and 60 and 61, respectively. The shoe lining 20 is caused to frictionally engage the drum 12. Concurrently the shoes 16—19 swing about the respective pins 36, 37, 50 and 51 depending upon the direction of rotation so that the ends of the shoes are moved approximately uniformly into engagement with the drum. Since substantially all of the braking surface of the drum is utilized, there is substantially equal radial pressure along the peripheral braking surface of the drum. As a result, the drum is not distorted into an oval shape before sufficient braking pressure is built up to give the desired braking effect. This reduces the amount of travel through which the braking force must operate, and no allowance need be made in "pedal travel" to take care of the movement of the brake shoes in distorting the drum. Also the geometry of the mechanism is such as to effect self-energization (friction between shoe and drum aiding in holding the shoe in engagement with the drum) of the mechanism in either direction of rotation of the drum. Furthermore, since all shoes are simultaneously exerting a uniform force on the drum, any tendency to cause distortion thereof will be minimized.

It will be seen that the foregoing construction results in a brake mechanism that is compact, that is simple in construction, that is of light weight, and that is rugged. Moreover, the brake mechanism is efficient and accomplishes the objects set forth in the beginning of the specification.

I claim:

1. A brake mechanism comprising a brake drum rotatable in either direction of rotation, four rigid shoes in a common plane each having a frictional surface extending through an arc approaching but less than 90° and shaped to engage said drum, diametrically opposed fixed anchors, means for pivotally supporting each of said shoes on a pair of diametrically opposed anchors, each shoe being movable from a retracted position in which each shoe is supported by both of its anchors and is out of engagement with the drum to an applied position in which the entire friction surface of each shoe uniformly engages the drum and each shoe is supported by only one anchor and is out of engagement with the other anchor, and means for simultaneously applying an equal radial force to each of said shoes at a position midway between the ends of each shoe for moving the shoes simultaneously from said retracted position into engagement with the drum to thereby cause the drum to carry the shoes to the aforesaid applied position and effect substantially equal self-energizing of the shoes.

2. Mechanism comprising a drum rotatable in either direction of rotation and having a cylindrical friction surface, a stationary mounting plate, said plate having two pairs of diametrically opposed anchors positioned adjacent said friction surface and spaced uniformly around said friction surface, four rigid shoes circumferentially alined about said drum each having an arc approaching but less than 90° and engageable with a portion of said friction surface, means on each shoe for engaging a pair of diametrically opposed anchors for pivotal and translatory movement with respect thereto, biasing means for retaining each shoe in a position in which it is supported by both anchors of the respective pair of anchors and is out of engagement with the drum, and means for simultaneously applying approximately equal forces at the midpoint of each shoe to move said shoes into engagement with said friction surface for movement by the drum into an applied position in which the shoe is supported by one or the other anchor dependent upon the direction of rotation of the drum and is out of engagement with the other anchor to cause said shoes to engage said cylindrical friction surface throughout the arc of the shoe to produce substantially uniform wear on the shoe and a uniform self-energizing action in response to rotation of the drum in either direction.

3. In a brake mechanism, the combination of a drum arranged for rotation in either of two directions and having an annular friction surface, a plurality of spaced pairs of diametrically disposed anchors, four rigid brake shoes each having an arcuate friction surface approximately, but less than, 90° engageable with said drum, a pair of spaced bearing arms integral with each of said shoes, each said pair of bearing arms being engageable with a pair of diametrically opposed anchors to provide diametrically opposed pivotal supports for each shoe and to permit translatory movement of the shoe, each shoe being movable from a retracted position in which the shoe is supported by both anchors and is out of engagement with the drum to an applied position in which the shoe is pivotally supported by one anchor and engages the drum uniformly throughout the arc of the shoe in self-energized relation and is out of engagement with the other anchor, resilient means for holding said brake shoes in said retracted position, and means for simultaneously applying an approximately equal force to the midpoint of each shoe for urging said shoes against the action of said resilient retracting means to move said shoe simultaneously into engagement with the drum, the initial engagement of each shoe with the drum carrying the shoe to said applied position.

4. In a brake mechanism, the combination of a brake drum having an annular friction surface, four arcuate shaped brake shoes spaced annularly within the drum each having a friction surface approximately but less than 90° arranged to engage said drum, diametrically opposed fixed pairs of anchors, means for supporting each of said shoes on one of said pairs of diametrically opposed anchors for pivotal and translatory movement of the shoe with respect to the anchors, means for retaining each of said shoes in a retracted position in which it is supported by both anchors and is out of engagement with the drum, and means for simultaneously applying an equal force to each shoe for moving said shoes into engagement with the annular friction surface for movement therewith to an applied position in which each shoe is supported by one anchor and is out of engagement with the other anchor and each shoe uniformly engages the drum throughout the entire friction surface of the shoe to insure uniform wear of the shoe and provide for equal self-energization of the shoes and to prevent distortion of the drum from its normal cylindrical shape and insure that the maximum surface of the drum is utilized in a braking operation in both directions of rotation of the drum.

5. The combination recited in claim 3 in which said means for simultaneously applying an approximately equal force to the midpoint of each shoe comprises an arm rigid with each shoe disposed centrally of the bearing arms and extending radially inwardly of the drum and an axially movable cam simultaneously engageable with said centrally disposed rigid arms of each shoe for simultaneously controlling the movement of each shoe to insure that the pressure over the arcuate surface of each shoe is uniform and that the pressure between each shoe and the drum is uniform.

6. In an internal expanding brake mechanism, the combination of a brake drum rotatable in either of two directions and having a cylindrical annular flange, four rigid shoes disposed in a common plane each having a frictional surface extending through an arc approaching but less than 90 degrees, said shoes being engageable respectively with separate areas of the inner surface of said annular flange, spaced diametrically opposed pairs of anchors, means for mounting said anchors in fixed relation, means for supporting each shoe on a pair of diametrically opposed anchors providing for pivotal and translatory movement of each shoe with respect to its associated anchors, means for retaining each of said shoes in a retracted position in which it is supported by both of its anchors and is out of engagement with the drum, and means for simultaneously applying an approximately equal force to each shoe for moving the friction surface of each shoe uniformly throughout the length of the shoe into engagement with the flange, said shoes upon engagement with the flange moving therewith to an applied position in which each shoe is supported by one of its diametrically opposed anchors and is out of engagement with the other anchor and the arcuate friction surface of each shoe is in uniform engagement with the drum to thereby apply substantially uniform pressure around the periphery of the flange in response to further movement of the shoes thereagainst whereby to prevent distortion of the flange and insure uniform wear of the brake shoes.

7. A brake mechanism comprising a rotatable brake drum having a cylindrical friction surface, a plurality of rigid brake shoes each having an arcuate friction surface of less than 90 degrees shaped to engage the drum, a plurality of spaced pairs of diametrically opposed fixed anchors, means for pivotally supporting each of said shoes on a pair of diametrically opposed anchors, each shoe being movable from a retracted position in which it is supported by both of its anchors and is out of engagement with the drum to an applied position in which the entire arcuate friction surface of the shoe substantially uniformly engages the brake drum and in which applied position the shoe is supported by only one anchor and is disengaged from the other anchor of the pair of supporting anchors, and means for applying a force to said shoes to move the same into engagement with the drum.

8. A brake mechanism comprising a brake drum rotatable in either direction and having an annular friction surface, a plurality of rigid brake shoes each having an arcuate friction surface extending through an arc of less than 90 degrees, said shoes being engageable respectively with separate areas of the brake drum friction surface, a plurality of spaced pairs of diametrically opposed fixed anchors, means for pivotally supporting each of said shoes on a pair of diametrically opposed anchors, biasing means for urging each shoe to a retracted position in which it is supported by both anchors of the respective pair and is out of engagement with the drum, each shoe being movable from its retracted position to an applied position in which its entire arcuate friction surface substantially uniformly engages the drum friction surface and in which it is supported by only one anchor and is disengaged from the other anchor of the pair of supporting anchors, and means for simultaneously applying equal radial forces to each shoe at a position midway along the arcuate extent thereof for moving the shoes simultaneously from said retracted position into engagement with the drum to thereby cause rotation of the drum to carry the shoes to the aforesaid applied position and to effect substantially equal self-energizing of the shoes.

DUNCAN P. FORBES.

REFERENCES CITED

The following references are of record in the file of this patent:

UNITED STATES PATENTS

| Number | Name | Date |
|---|---|---|
| 760,516 | Baumgartner et al. | May 24, 1904 |
| 1,135,148 | Alden | Apr. 13, 1913 |
| 1,561,905 | Brown | Nov. 17, 1925 |
| 1,563,636 | Lewis | Dec. 1, 1925 |
| 1,594,259 | Hardman | July 27, 1926 |
| 1,752,478 | Dodge | Apr. 1, 1930 |
| 1,824,510 | Sneed | Sept. 22, 1931 |
| 1,828,061 | Morgan | Oct. 20, 1931 |
| 2,001,938 | Parker | May 21, 1935 |
| 2,213,383 | Canfield | Sept. 3, 1940 |
| 2,389,311 | Hirschman et al. | Nov. 20, 1945 |

FOREIGN PATENTS

| Number | Country | Date |
|---|---|---|
| 258,147 | Great Britain | Sept. 16, 1926 |
| 639,423 | France | Mar. 10, 1928 |